United States Patent
Moon et al.

(10) Patent No.: US 8,909,376 B2
(45) Date of Patent: Dec. 9, 2014

(54) ROBOT HAND AND METHOD OF CONTROLLING THE SAME

(75) Inventors: Kyung Won Moon, Seoul (KR); Hyun Kyu Kim, Seoul (KR); Jong Do Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 763 days.

(21) Appl. No.: 12/588,766

(22) Filed: Oct. 27, 2009

(65) Prior Publication Data
US 2010/0138039 A1    Jun. 3, 2010

(30) Foreign Application Priority Data
Dec. 2, 2008    (KR) .......................... 10-2008-121378

(51) Int. Cl.
*B66C 1/42* (2006.01)
*C25D 11/04* (2006.01)
*C25D 7/00* (2006.01)

(52) U.S. Cl.
USPC ........................................... 700/260; 901/31

(58) Field of Classification Search
USPC .................. 294/106, 907; 901/38, 46, 30, 31; 318/568.16, 568.21; 3/1.1, 12.5; 700/245, 260
See application file for complete search history.

(56) References Cited

U.S. PATENT DOCUMENTS

| | | | |
|---|---|---|---|
| 4,246,661 A * | 1/1981 | Pinson | 623/25 |
| 4,367,891 A * | 1/1983 | Wauer et al. | 294/197 |
| 4,821,594 A * | 4/1989 | Rosheim et al. | 74/490.05 |
| 4,980,626 A * | 12/1990 | Hess et al. | 318/568.16 |
| 5,378,033 A * | 1/1995 | Guo et al. | 294/116 |
| 5,501,498 A * | 3/1996 | Ulrich | 294/106 |
| 5,967,580 A * | 10/1999 | Rosheim | 294/198 |
| 6,128,004 A * | 10/2000 | McDowall et al. | 345/158 |
| 6,517,132 B2 * | 2/2003 | Matsuda et al. | 294/106 |
| 6,817,641 B1 * | 11/2004 | Singleton, Jr. | 294/106 |
| 7,168,748 B2 * | 1/2007 | Townsend et al. | 294/106 |
| 7,549,688 B2 * | 6/2009 | Hayakawa et al. | 294/106 |
| 2009/0302626 A1 * | 12/2009 | Dollar et al. | 294/106 |

* cited by examiner

*Primary Examiner* — Ronnie Mancho
(74) *Attorney, Agent, or Firm* — Staas & Halsey LLP

(57) ABSTRACT

Disclosed herein is a method of controlling a robot hand similar to a hand of a human being such that the robot hand naturally and safely grasps an object. The robot hand, including fingers and a palm, is capable of naturally and safely grasping an object, by the tip of each finger performing impedance control while following the optimal path on a Cartesian coordinate system, although the robot hand cannot reach a position ideal to grasp the object due to sensor errors or shape information of the object to be grasped is not correctly recognized. Also, the robot hand is capable of stably grasping the object even when moving or manipulating the object.

19 Claims, 7 Drawing Sheets

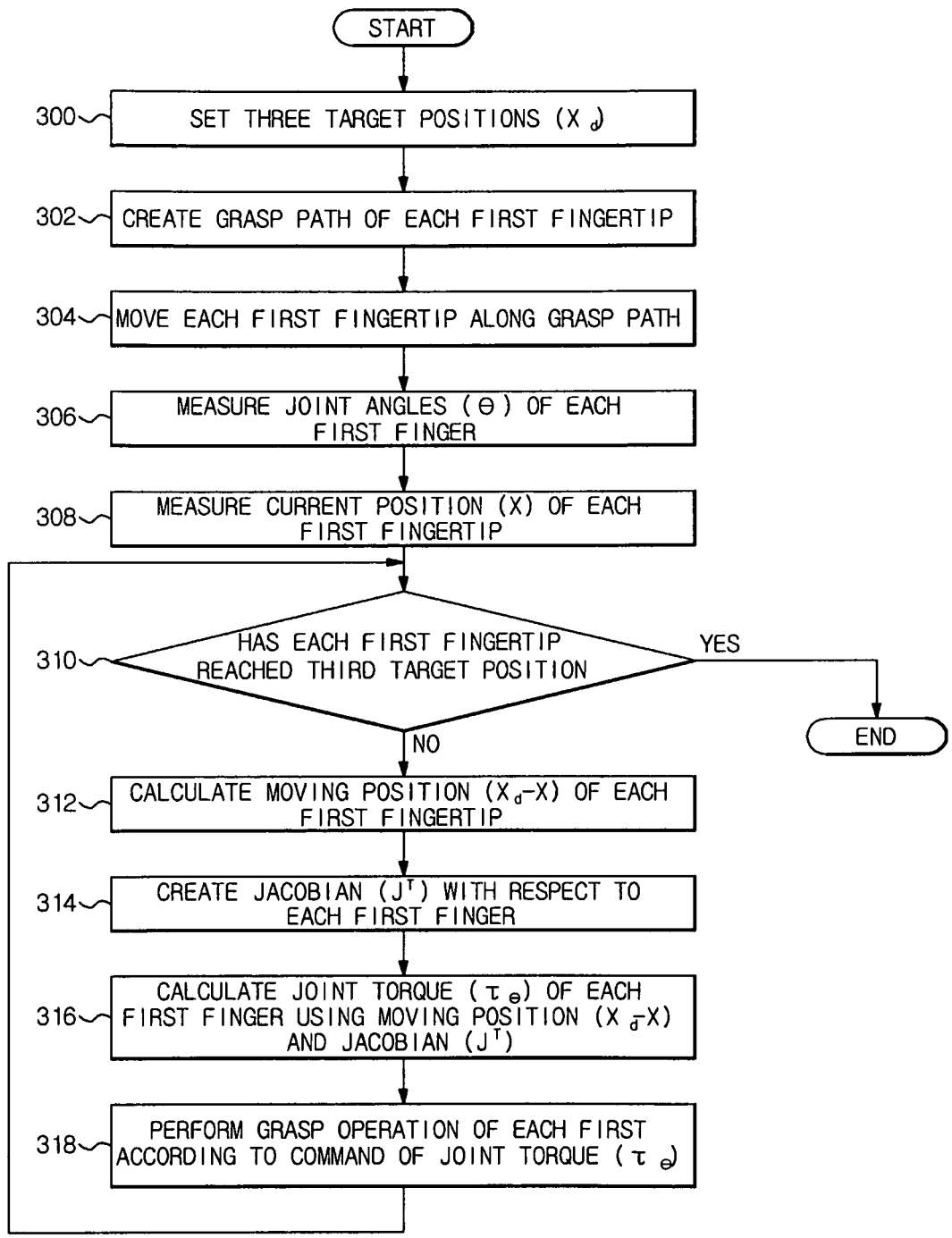

ROBOT HAND AND METHOD OF CONTROLLING THE SAME

CROSS-REFERENCE TO RELATED APPLICATIONS

This application claims the priority benefit of Korean Patent Application No. 2008-0121378, filed on Dec. 2, 2008 in the Korean Intellectual Property Office, the disclosure of which is incorporated herein by reference.

BACKGROUND

1. Field

Embodiments relate to a method of controlling a robot hand similar to a hand of a human being such that the robot hand naturally and safely grasps an object.

2. Description of the Related Art

Generally, an apparatus to perform a motion similar to that of a human being using an electric or magnetic action is called a robot. Early robots were industrial robots, such as a manipulator and a transfer robot, for work automation and unmanned operations in a production field. Such robots was used to perform dangerous works, simple and repetitive works, and works needing a large force in behalf of human beings. In recent years, there has been actively conducted research and development of a humanoid robot having an appearance similar to that of a human being, coexisting with a human being in a working and living space of the human being, and providing various kinds of services.

The humanoid robot has a robot hand configured to grasp an object such that the humanoid robot smoothly conduct interchange with and cooperate with a human being in everyday life. The robot hand includes a plurality of fingers and a palm, like a hand of a human being. It is possible for the robot hand to perform not only an accurate work but also a flexible and safe work by adjusting the stiffness at tips of the fingers through impedance control. In particular, it is possible for the robot hand to safely interact with a human being through the implementation of flexible stiffness. Also, it is possible for the robot hand to grasp an object although shape information of the object is incorrect.

However, the grasp control of the conventional robot hand is based on grasping an object only using tips of the fingers without using the palm and on manipulating the object, with the result that it is not possible to naturally and safely grasp the object.

SUMMARY

In accordance with an aspect of exemplary embodiments, there is provided a robot hand that is capable of naturally and safely grasping an object through impedance control to enable tips of fingers to follow the optimal path and stably grasping the object even when moving or manipulating the object and a method of controlling the same.

In accordance with an aspect of exemplary embodiments, there is provided a method of controlling a robot hand having a palm and a plurality of fingers connected to the palm, the method including setting a plurality of target positions for the respective fingers, creating grasp paths corresponding to the fingers based on the set target positions, and performing an impedance control while moving the fingers along the created grasp paths.

The fingers may include a plurality of first fingers extending from the palm in the same direction and at least one second finger extending in a direction different from that of the first fingers.

The target positions may be positions to which tips of the first fingers are to move.

The first and second fingers may include a plurality of link members configured to be bent such that the link members face each other.

The target positions may include a first target position where all the first fingers are stretched out, a second target position where the first fingers come into contact with the second finger, and a third target position where the first fingers come into contact with the palm.

The first target position may be a position of a tip of each first finger at a point where an angle between neighboring ones of the link members of each first finger is 180 degrees.

The second target position may be a position of a tip of each first finger at a point where a circle inscribed in a polygon formed by the link members of each first finger, the palm, and the link members of the second finger is the greatest.

The third target position may be a position of a tip of each first finger at a point where an angle between neighboring ones of the link members of each first finger is the minimum.

The creating the grasp paths may include creating a quadratic curve based on the first to third target positions and creating a path along which a tip of each first finger moves using the created quadratic curve.

The performing the impedance control may include measuring a current position of a tip of each first finger, comparing the measured current position with the set target positions and calculating a moving position of the tip of each first finger, calculating a joint torque at the tip of each first finger using the calculated moving position, and controlling a grasp operation of the tip of each first finger according to the calculated joint torque.

The measuring the current position of the tip of each first finger may include measuring joint angles of each first finger and measuring the current position of the tip of each first finger using a function of the measured joint angles.

The moving position may be a value obtained by subtracting the current position from one of the target positions.

The method may further include obtaining a Jacobian of an impedance control input using a Jacobian matrix according to the moving position.

The performing the impedance control may further include calculating the joint torque at the tip of each first finger using the Jacobian and the moving position.

In accordance with an aspect of exemplary embodiments, there is provided a method of controlling a robot hand, the method including setting a plurality of target positions to which tips of fingers performing a grasp operation are to move, creating grasp paths corresponding to the tips of the fingers using the set target positions, and performing an impedance control while moving the tips of the fingers along the created grasp paths.

In accordance with an aspect of exemplary embodiments, there is provided a robot hand including a palm, a plurality of fingers connected to the palm to perform a grasp operation, and a control unit to set a plurality of target positions to which a tip of each finger is to move, create grasp paths based on the set target positions, and perform an impedance control while moving the tips of the fingers along the created grasp paths.

BRIEF DESCRIPTION OF THE DRAWINGS

These and/or other aspects of exemplary embodiments will become apparent and more readily appreciated from the following description of exemplary embodiments, taken in conjunction with the accompanying drawings, of which:

FIG. 7 is a flow chart illustrating a grasp control method of the robot hand according to an exemplary embodiment.

DETAILED DESCRIPTION

Figure 1:
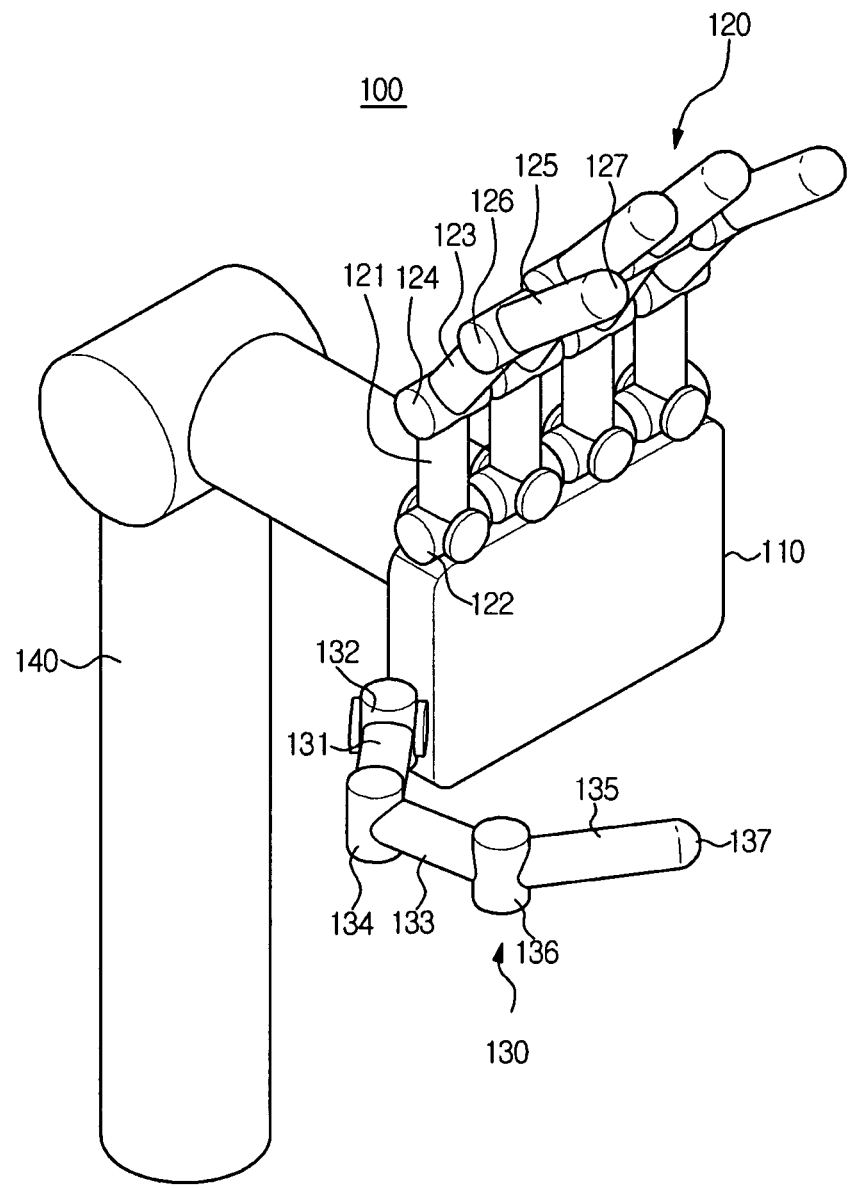
FIG. 1 is a perspective view illustrating the schematic structure of a robot hand according to an exemplary embodiment.

Reference will now be made in detail to exemplary embodiments, examples of which are illustrated in the accompanying drawings, wherein like reference numerals refer to like elements throughout. Exemplary embodiments are described below by referring to the figures.

FIG. 1 is a perspective view illustrating the schematic structure of a robot hand 100 according to an exemplary embodiment.

As shown in FIG. 1, the robot hand 100 includes a palm 110 and a plurality of fingers 120 and 130 connected to the palm 110. The palm 110 is connected to an arm 140 with at least one degree of freedom.

The fingers 120 and 130 include a plurality of main grasping fingers 120 (hereinafter, referred to as first fingers) extending from the edge of one end of the palm 110 in the same direction such that the first fingers 120 can be bent toward the palm 110 and at least one auxiliary grasping finger 130 (hereinafter, referred to as at least one second finger) extending in the direction different from that of the first fingers 120 such that the at least one second finger can be bent toward the palm 110.

The first fingers 120 respond to the index finger, the middle finger, the medical finger, and the little finger of a human being, and the at least one second finger 130 corresponds to the thumb of the human being. The first and second fingers 120 and 130 include pluralities of link members 121, 123, 125, 131, 133, and 135 and pluralities of joints 122, 124, 126, 132, 134, and 136 to interconnect the link members 121, 123, 125 and 131, 133, 135.

The link members 121, 123, 125, 131, 133, and 135 include first link members 121 and 131, second link members 123 and 133, and third link members 125 and 135, which are sequentially arranged from the palm 110 in order. The joints 122, 124, 126, 132, 134, and 136 include first joints 122 and 132, second joints 124 and 134, and third joints 126 and 136, which are sequentially arranged from the palm 110 in order. The first joints 122 and 132 connect the first link members 121 and 131 to the palm 110, respectively. The second joints 124 and 134 connect the second link members 123 and 133 to the first link members 121 and 131, respectively. The third joints 126 and 136 connect the third link members 125 and 135 to the second link members 123 and 133, respectively. Tips 127 and 137 of the third link members 125 and 135 constitute fingertips of the respective fingers 120 and 130, respectively. At the joints 122, 124, 126, 132, 134, and 136 are mounted encoders (not shown) to measure angles between neighboring ones of the link members 121, 123, 125, 131, 133, and 135, i.e., joint angles θ.

The positions of the tips 127 and 137 of the respective fingers 120 and 130 are decided by a Cartesian coordinate system created on the basis of an arbitrary point in the robot hand. Alternatively, the positions of the tips 127 and 137 of the respective fingers 120 and 130 may be displayed by a Cartesian coordinate system of a robot arm system having the robot hand 100 mounted thereto though the conversion of the coordinate system. For grasp, impedance control is performed while changing the target positions of the tips 127 and 137 of the respective fingers 120 and 130.

The impedance control is a method of appropriately controlling stiffness against the limit in positional control exhibiting great stiffness (K=stiffness coefficient included in impedance properties) such that an appropriate force is applied to the fingers 120 and 130 during the grasp control of the fingers 120 and 130. Through the impedance control, it is possible to provide various kinds of stiffness between target positions and actual positions of each fingertip 127 and thus to provide the robot, which exhibits lower accuracy to sense an object in the grasp of the object than a human being, with more stable and higher grasp success rate.

For optimal grasp through such impedance control, an exemplary embodiment creates a grasp path along which each first fingertip 127 optimally moves similarly to a path along which a human being moves when grasping an object. To create an optimal grasp path, an exemplary embodiment sets three target positions to which each first fingertip 127 is to move and creates a quadratic-curve grasp path based on the three set target positions, which will be described hereinafter with reference to FIGS. 2 to 5.

Figure 2:
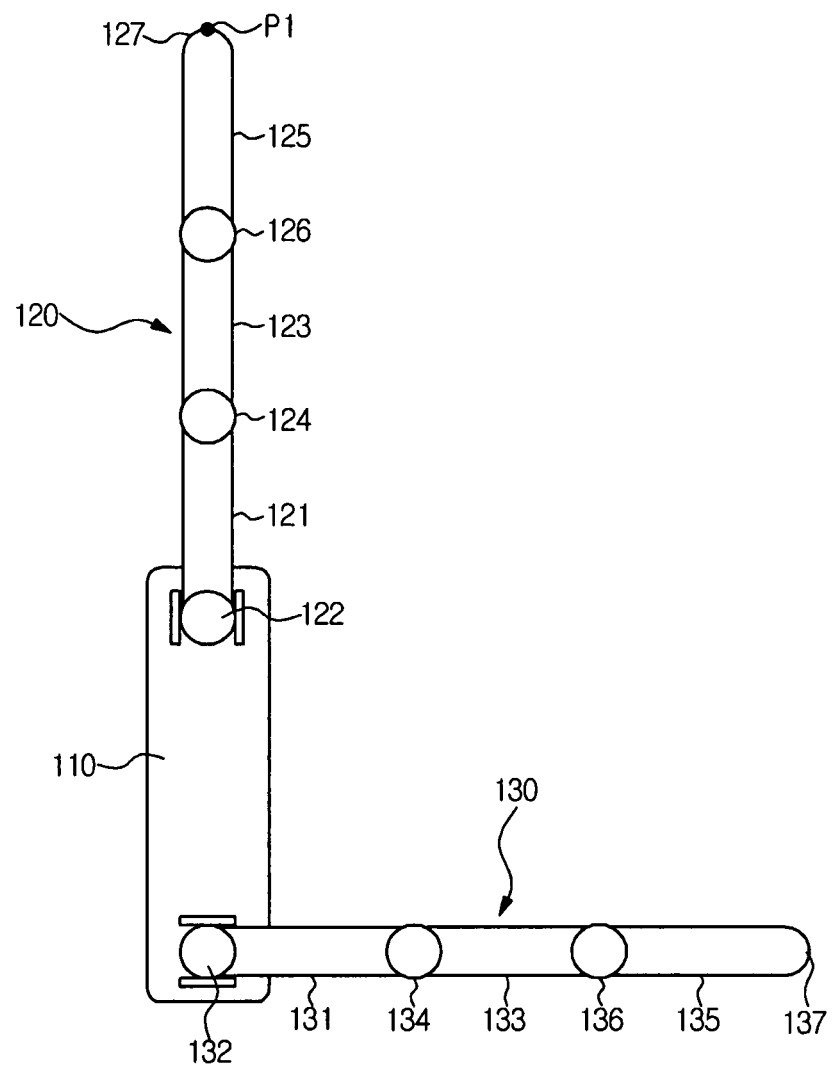
FIG. 2 is a view illustrating a first operation state of the robot hand according to an exemplary embodiment.

FIG. 2 is a view illustrating a first operation state of the robot hand according to an exemplary embodiment, especially illustrating a first target position P1 of each first fingertip 127.

Referring to FIG. 2, the first target position P1 is a position of each fingertip 127 at the point where each first finger 120 is stretched out, i.e., the angle between neighboring ones of the link members 121, 123, and 125 of each first finger 120 is 180 degrees. At this time, the second finger 130 is also stretched out such that the angle between neighboring ones of the link members 131, 133, and 135 of the second finger 130 is 180 degrees.

Figure 3:
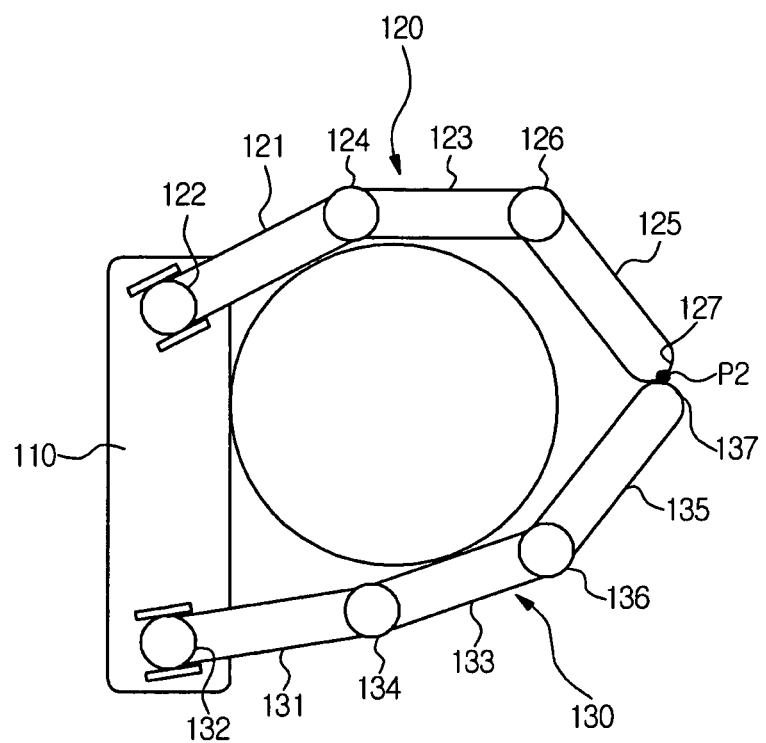
FIG. 3 is a view illustrating a second operation state of the robot hand according to an exemplary embodiment.

FIG. 3 is a view illustrating a second operation state of the robot hand according to an exemplary embodiment, especially illustrating a second target position P2 of each first fingertip 127.

Referring to FIG. 3, when each first finger 120 and the second finger 130 come into contact with each other, i.e., when the fingertip 127 of one, of the first fingers 120, which can come into contact with the second finger 130 (the middle finger) and the tip 137 of the second finger come into contact with each other, the second target position P2 is a position of the first fingertip 127 at the point where a circle inscribed in a polygon formed by the link members 121, 123, and 125 of the first finger 120, the palm 110, and the link members 131, 133, and 135 of the second finger 130 is the greatest.

Figure 4:
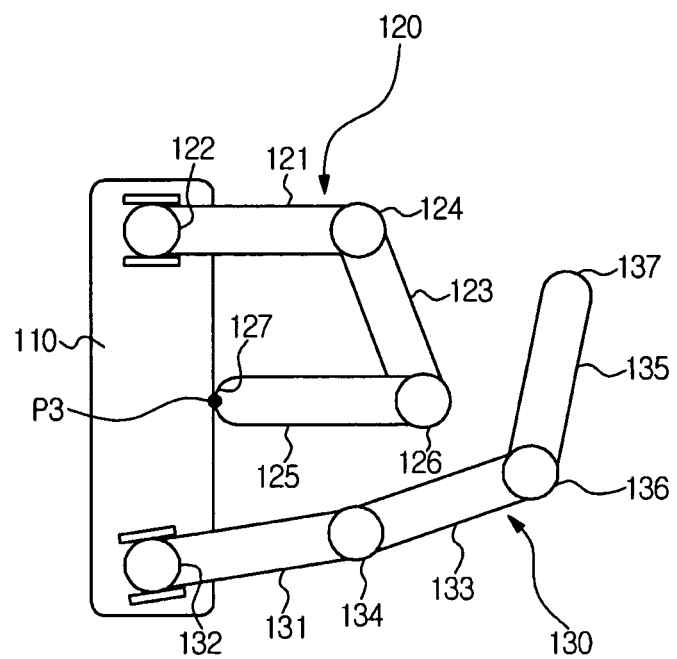
FIG. 4 is a view illustrating a third operation state of the robot hand according to an exemplary embodiment.

FIG. 4 is a view illustrating a third operation state of the robot hand according to an exemplary, especially illustrating a third target position P3 of each first fingertip 127.

Referring to FIG. 3, the third target position P3 is a position of the first fingertip 127 at the point where the angle between neighboring ones of the link members 121, 123, and 125 of each first finger 120 is the minimum, i.e., at the point where each first finger 120 performs a full grasp operation without an object. That is, the third target position P3 is a grasp position where even the palm 110 is used. At this time, the angle between neighboring ones of the link members 131, 133, and 135 of the second finger 130 is also maintained at predetermined level.

Figure 5:
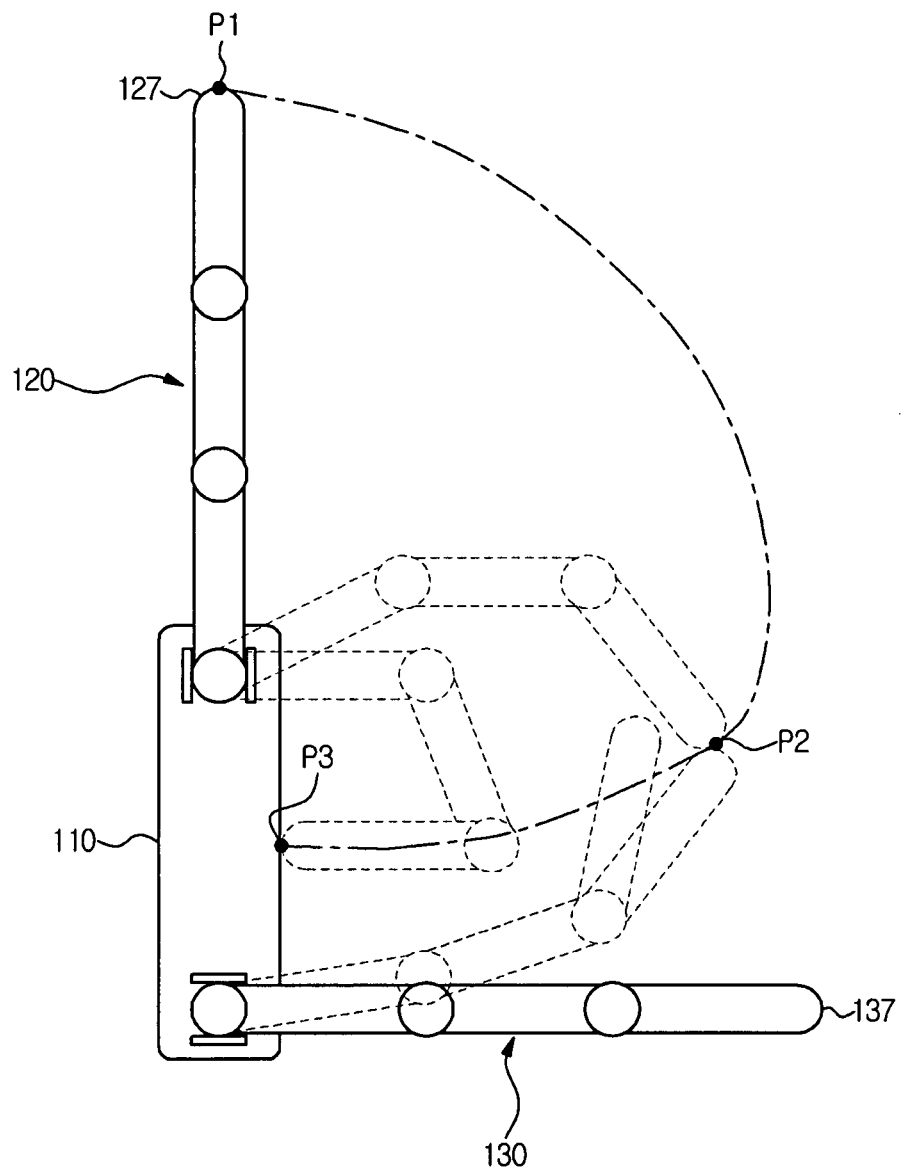
FIG. 5 is a view illustrating an operation path of the robot hand according to an exemplary embodiment.

FIG. 5 is a view illustrating an operation path of the robot hand according to an exemplary embodiment. A quadratic curve is created based on the first to third target positions P1, P2, and P3, and a grasp path in which each first fingertip 127 moves along the curve.

Referring to FIG. 5, the position of each first fingertip 127 is set such that the first fingertip 127 moves along the grasp path formed by the first target position P1, the second target position P2, and the third target position P3, thereby holding an object in a wrapping fashion similarly to a path along which a human being moves when grasping an object. Also, the object is completely grasped even when using the palm 110. Consequently, even when the object slightly deviates from an ideal grasp position or the shape of the object is not uniform, it is possible to grasp the object in a wrapping fashion, thereby further improving a grasp success rate.

As shown in FIG. 5, the power grasp to completely grasp an object is a grasp method frequently used in everyday life, which is necessary not only to move the object but also to manipulate the object with one hand while holding the object with another hand.

Figure 6:
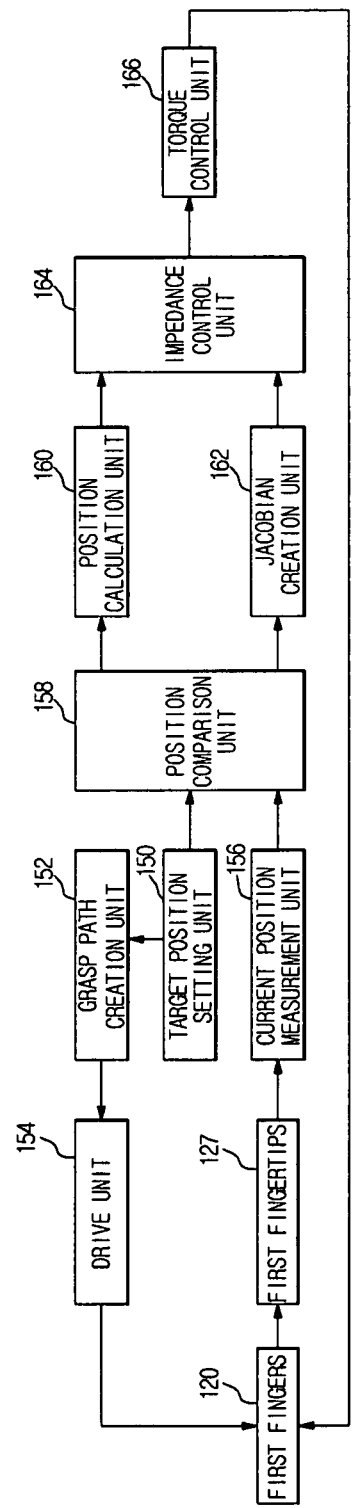
FIG. 6 is a control block diagram of the robot hand according to an exemplary embodiment.

FIG. 6 is a control block diagram of the robot hand according to an exemplary embodiment. The robot hand includes a target position setting unit 150, a grasp path creation unit 152, a drive unit 154, a current position measurement unit 156, a position comparison unit 158, a position calculation unit 160, a Jacobian creation unit 162, an impedance control unit 164, and a torque control unit 166.

The target position setting unit 150 sets target positions $X_d$ to which the tip 127 of each first finger 120 is to move such that the tip 127 of each first finger 120 follows the optimal path on a Cartesian coordinate system, to perform a grasp operation using each first finger 120 and the second finger 130. Specifically, the target position setting unit 150 sets a grasp path of each first fingertip 127 such that each first fingertip 127 holds an object in a wrapping fashion similarly to a path along which a human being moves when grasping an object. Also, the target position setting unit 150 sets a grasp path of each first fingertip 127 such that even the palm 110 is used. To this end, the target position setting unit 150 sets the target positions $X_d$ of each finger tip 127 to be the three positions P1, P2, and P3 shown in FIGS. 2 to 4.

The grasp path creation unit 152 creates a quadratic curve based on the three target positions $X_d$ (P1, P2, and P3) set by the target position setting unit 150, and creates a grasp path of each first fingertip 127, such that each first fingertip 127 moves along the curve, as shown in FIG. 5.

The drive unit 154 drives joint motors of each first finger 120 such that the tip 127 of each first finger 120 follows the grasp path created by the grasp path creation unit 152.

The current position measurement unit 156 reads joint angles θ of each first finger 120 using encoders (or velocity sensors, such as tachometers, or position sensors) to measure the joint angles θ of each first finger 120, and measures the current absolute coordinate position X (hereinafter, referred to as the current position) of each first fingertip 127 from the read joint angles θ.

The position comparison unit 158 compares the current position X of each first fingertip 127 measured by the current position measurement unit 156 with the predetermined three target positions $X_d$ (P1, P2, and P3) to determine whether the current position X of each first fingertip 127 has reached the third target position $X_d$ (P3).

When the position comparison unit 158 determines that the current position X of each first fingertip 127 has not reached the third target position $X_d$ (P3), the position calculation unit 160 calculates a position $X_d$–X (hereinafter, referred to as a moving position) to move on a Cartesian coordinate system until each first fingertip 127 reaches the third target position $X_d$(P3) from the current position X for each of the three target positions $X_d$ (P1, P2, and P3).

The Jacobian creation unit 162 creates Jacobian $J^T$ with respect to each first finger 120 using the moving position $X_d$–X calculated by the position calculation unit 160.

The impedance control unit 164 performs impedance control to calculate joint torque $T_\theta$ which will be generated at each first finger 120 using the Jacobian $J^T$ created by the Jacobian creation unit 162, the moving position $X_d$–X calculated by the position calculation unit 160, and a stiffness coefficient K previously inputted with respect to the Cartesian coordinate system. K is a stiffness coefficient for the impedance control, which is a value previously inputted.

The torque control unit 166 moves the tip 127 of each first finger 120 to the target positions $X_d$ (P1, P2, and P3) according to a command of the joint torque $T_\theta$ at each first finger 120 calculated by the impedance control unit 164, and performs the grasp operation of each first finger 120.

Hereinafter, a method of controlling the robot hand with the above-stated construction will be described.

First, the Jacobian and impedance control of each first finger 120 will be described to explain an operation principle of an exemplary embodiment.

The current position X of each first fingertip 127 may be expressed as a function of joint angle θ as represented by Equation [1] below.

$$X = f(\theta) \qquad \text{Equation [1]}$$

J of Equation [2] obtained by differentiating Equation [1] is called Jacobian, which denotes a mapping of a Cartesian space and a function space of joint angle θ.

$$\dot{X} = J\dot{\theta} \qquad \text{Equation [2]}$$

Where, J indicates a Jacobian transposed matrix with respect to a Cartesian coordinate system.

The impedance control is a method of appropriately controlling stiffness against the limit in positional control exhibiting great stiffness such that an appropriate force is applied to the each first finger 120 during the grasp control of each first finger 120. The impedance control in the Cartesian space may be represented by Equation 3 below.

$$T_\theta = J^T K (X_d - X) \qquad \text{Equation [3]}$$

Where, $T_\theta$ indicates joint torque at each first finger 120, $J^T$ indicates a Jacobian transposed matrix of each first finger 120 on a Cartesian coordinate system, K indicates a coefficient of impedance stiffness, $X_d$ indicates the target position of each first fingertip 127, and X indicates the current position of each first fingertip 127.

When performing the impedance control, it is possible to set stiffness between target positions and actual positions of the tip 127 of each first finger 120. When the stiffness is flexibly set, it is possible for each first finger 120 to appropriately come into tight contact with an object according to the shape of the object and thus to stably grasp the object, without individually controlling each first finger 120 depending upon the shape of the object to be grasped during the grasp control.

For each first fingertip 127 to perform the grasp operation using the impedance control, it is required for each first fingertip 127 to perform the impedance control while following the optimal grasp path shown in FIG. 5 on a Cartesian coordinate system, which will be described in detail with reference to FIG. 7.

FIG. 7 is a flow chart illustrating a grasp control method of the robot hand according to an exemplary embodiment.

First, the target position setting unit 150 sets the target positions $X_d$ to which each first finger tip 127 is to move to be the three positions P1, P2, and P3 shown in FIGS. 2 to 4, for the optimal grasp of an object (300).

When the three target positions $X_d$ (P1, P2, and P3) are set, the grasp path creation unit 152 creates a quadratic curve based on the set three target positions $X_d$ (P1, P2, and P3), and creates a grasp path of each first fingertip 127, such that each first fingertip 127 moves along the curve, as shown in FIG. 5 (302).

When the grasp path is created, the drive unit 154 drives the respective joint motors of each first finger 120 such that the tip 127 of each first finger 120 moves while following the created optimal grasp path on a Cartesian coordinate system (304).

For each first fingertip 127 to perform the impedance control while following the optimal grasp path, as described above, the current position measurement unit 156 reads the joint angles θ of each first finger 120 using encoders (or velocity sensors, such as tachometers, or position sensors) to measure the joint angles θ of each first finger 120 (306), and measures the current position X of each first fingertip 127 from the read joint angles θ (308).

Subsequently, the position comparison unit 158 compares the current position X of each first fingertip 127 measured by the current position measurement unit 156 with the predetermined three target positions $X_d$ (P1, P2, and P3) to determine whether the current position X of each first fingertip 127 has reached the third target position $X_d$ (P3) (310).

When it is determined at Operation 310 that the current position X of each first fingertip 127 has reached the third target position $X_d$ (P3), the grasp operation using each first finger 120 is ended. When it is determined that the current position X of each first fingertip 127 has not reached the third target position $X_d$ (P3), the position calculation unit 160 calculates the position $X_d$-X to move on a Cartesian coordinate system until each first fingertip 127 reaches the target positions $X_d$ (P1, P2, and P3) from the current position X of each first fingertip 127 for each of the three target positions $X_d$ (P1, P2, and P3) (312).

Subsequently, the Jacobian creation unit 162 creates Jacobian $J^T$ with respect to each first finger 120 using the moving position $X_d$-X calculated by the position calculation unit 160 (314).

When the Jacobian $J^T$ with respect to each first finger 120 is created, the impedance control unit 164 performs impedance control using the Jacobian $J^T$ inputted from the Jacobian creation unit 162 and the three moving positions $X_d$-X inputted from the position calculation unit 160 to calculate joint torque $T_\theta$ which will be generated at each first finger 120 and input the calculated joint torque $T_\theta$ to the torque control unit 166 (316).

The impedance control to calculate the joint torque $T_\theta$ at each first finger 120 may be represented by Equation 3 below.

$$T_\theta = J^T K (X_d - X)$$ Equation [3]

The impedance control is an algorithm to calculate a command of the joint torque $T_\theta$ such that each first fingertip 127 performs a grasp operation while moving to a desired target position along the optimal grasp path shown in FIG. 5 by applying an appropriate force to each first finger 120, during the grasp operation, to provide hardness or softness to the movement of each first finger 120.

Consequently, the torque control unit 166 moves the tip 127 of each first finger 120 to the target position $X_d$ according to a command of the joint torque $T_\theta$ at each first finger 120 calculated by the impedance control unit 164, and performs the grasp operation of each first finger 120 (318). Subsequent operations are repeatedly performed until each first finger 120 reaches the final position, i.e., the third target position P3.

In a previous exemplary embodiment, there was described as an example that the tip 127 of each first finger 120 performs the impedance control while following the optimal grasp path to naturally and safely achieve the grasp operation although the robot hand 100 cannot reach a position ideal to grasp an object due to sensor errors or shape information of an object to be grasped is not correctly recognized. However, exemplary embodiments are not limited to previous exemplary embodiments. For example, the tip 137 of the second finger 130 may perform impedance control while following the optimal grasp path or by all the tips 127 and 137 of the first fingers 120 and the second finger 130 may perform impedance control while following the optimal grasp paths.

Also, in a previous exemplary embodiment, there was described as an example that the robot hand 100 is applied to a humanoid robot. However, exemplary embodiments are not limited to previous exemplary embodiments. For example, it is possible to naturally and safely achieve a grasp operation through impedance control using Jacobian while following the optimal grasp path even when performing the grasp operation using an industrial robot.

As apparent from the above description, the robot hand, including the fingers and the palm, has the effect of naturally and safely grasping an object, by the tip of each finger performing the impedance control while following the optimal path on a Cartesian coordinate system, although the robot hand cannot reach a position ideal to grasp the object due to sensor errors or shape information of the object to be grasped is not correctly recognized. Also, the robot hand has the effect of stably grasping the object even when moving or manipulating the object.

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. A method of controlling a robot hand having a palm and a plurality of fingers connected to the palm, the method comprising:

setting a plurality of target positions for the respective fingers;

creating grasp paths corresponding to the fingers based on the set target positions; and performing an impedance control while moving the fingers along the created grasp paths, wherein the target positions comprise a first target position where all the first fingers are stretched out, a second target position where the first fingers come into contact with the second finger, and a third target position where the first fingers come into contact with the palm, and wherein the impedance control controls stiffness between target positions and actual positions of each finger tip.

2. The method according to claim 1, wherein the fingers comprise a plurality of first fingers extending from the palm in the same direction and at least one second finger extending in a direction different from that of the first fingers.

3. The method according to claim 2, wherein the target positions are positions to which tips of the first fingers are to move.

4. The method according to claim 2, wherein the first and second fingers comprise a plurality of link members configured to be bent such that the link members face each other.

5. The method according to claim 1, wherein the first target position is a position of a tip of each first finger at a point where an angle between neighboring ones of the link members of each first finger is 180 degrees.

6. The method according to claim 1, wherein the second target position is a position of a tip of each first finger at a point where a circle inscribed in a polygon formed by the link members of each first finger, the palm, and the link members of the second finger is the greatest.

7. The method according to claim 1, wherein the third target position is a position of a tip of each first finger at a point where an angle between neighboring ones of the link members of each first finger is the minimum.

8. The method according to claim 1, wherein the creating the grasp paths comprises creating a quadratic curve based on the first to third target positions and creating a path along which the tip of each first finger moves using the created quadratic curve.

9. The method according to claim 1, wherein the performing the impedance control comprises:
measuring a current position of the tip of each first finger;
comparing the measured current position with the set target positions and calculating a moving position of the tip of each first finger;
calculating a joint torque at the tip of each first finger using the calculated moving position; and
controlling a grasp operation of the tip of each first finger according to the calculated joint torque.

10. The method according to claim 9, wherein the measuring the current position of the tip of each first finger comprises measuring joint angles of each first finger and measuring the current position of the tip of each first finger using a function of the measured joint angles.

11. The method according to claim 9, wherein the moving position is a value obtained by subtracting the current position from one of the target positions.

12. The method according to claim 11, further comprising obtaining a Jacobian of an impedance control input using a Jacobian matrix according to the moving position.

13. The method according to claim 12, wherein the performing the impedance control further comprises calculating the joint torque at the tip of each first finger using the Jacobian and the moving position.

14. A method of controlling a robot hand, the method comprising:
setting a plurality of target positions to which tips of fingers performing a grasp operation are to move;
creating grasp paths corresponding to the tips of the fingers using the set target positions; and
performing an impedance control while moving the tips of the fingers along the created grasp paths,
wherein the plurality of target positions comprise a first target position where the fingers are stretched out, a second target position where the tips of the fingers come into contact with one another, and a third target position where the tips of the fingers come into contact with a palm of the robot hand, and
wherein the impedance control controls stiffness between target positions and actual positions of each finger tip.

15. The method according to claim 14, wherein the fingers comprise a plurality of first fingers extending from the palm in the same direction and at least one second finger extending in a direction different from that of the first fingers.

16. The method according to claim 14, wherein the creating the grasp paths comprises creating a quadratic curve based on the target positions and creating paths along which the tips of the fingers move using the created quadratic curve.

17. A robot hand comprising:
a palm;
a plurality of fingers connected to the palm to perform a grasp operation; and
a control unit to set a plurality of target positions to which a tip of each finger is to move, create grasp paths based on the set target positions, and perform an impedance control while moving the tips of the fingers along the created grasp paths,
wherein the plurality of target positions comprise a first target position where the fingers are stretched out, a second target position where the fingers come into contact with one another, and a third target position where the fingers come into contact with the palm, and
wherein the impedance control controls stiffness between target positions and actual positions of each finger tip.

18. The robot hand according to claim 17, wherein the fingers comprise a plurality of first fingers extending from the palm in the same direction and at least one second finger extending in a direction different from that of the first fingers.

19. The robot hand according to claim 18, wherein the control unit creates a quadratic curve based on the target positions and creates paths along which tips of the first fingers move using the created quadratic curve.

* * * * *